United States Patent
Zundel et al.

(10) Patent No.: US 9,877,054 B2
(45) Date of Patent: Jan. 23, 2018

(54) DYNAMIC SCHEDULING FOR ADVANCED ADVERTISING IN LINEAR TELEVISION

(71) Applicant: IMAGINE COMMUNICATIONS CORP., Frisco, TX (US)

(72) Inventors: Jean-Pol Zundel, Sunnyvale, CA (US); John Tinsman, Santa Cruz, CA (US); Mark Crouse, Swarthmore, PA (US); Amit Verma, Sunnyvale, CA (US)

(73) Assignee: Imagine Communications Corp., Frisco, TX (US)

( * ) Notice: Subject to any disclaimer, the term of this patent is extended or adjusted under 35 U.S.C. 154(b) by 0 days.

(21) Appl. No.: 13/725,027

(22) Filed: Dec. 21, 2012

(65) Prior Publication Data

US 2013/0219427 A1  Aug. 22, 2013

Related U.S. Application Data

(60) Provisional application No. 61/601,982, filed on Feb. 22, 2012.

(51) Int. Cl.
| | |
|---|---|
| *H04N 7/025* | (2006.01) |
| *H04N 21/262* | (2011.01) |
| *H04N 21/234* | (2011.01) |
| *H04N 21/24* | (2011.01) |
| *H04N 21/2668* | (2011.01) |
| *H04N 21/81* | (2011.01) |

(52) U.S. Cl.
CPC ..... *H04N 21/262* (2013.01); *H04N 21/23424* (2013.01); *H04N 21/2407* (2013.01); *H04N 21/2668* (2013.01); *H04N 21/26258* (2013.01); *H04N 21/812* (2013.01)

(58) Field of Classification Search
None
See application file for complete search history.

(56) References Cited

U.S. PATENT DOCUMENTS

| | | | | |
|---|---|---|---|---|
| 7,194,235 | B2 * | 3/2007 | Nykanen et al. | 455/3.01 |
| 8,060,904 | B1 * | 11/2011 | Evans | H04N 21/23424 725/100 |
| 8,191,098 | B2 * | 5/2012 | Cooper et al. | 725/105 |
| 2003/0018745 | A1 * | 1/2003 | McGowan et al. | 709/217 |
| 2003/0070167 | A1 * | 4/2003 | Holtz et al. | 725/32 |
| 2003/0101451 | A1 * | 5/2003 | Bentolila et al. | 725/34 |
| 2005/0039206 | A1 * | 2/2005 | Opdycke | 725/35 |
| 2005/0246736 | A1 * | 11/2005 | Beyda et al. | 725/35 |
| 2007/0199017 | A1 * | 8/2007 | Cozen et al. | 725/35 |
| 2007/0271145 | A1 * | 11/2007 | Vest | 705/14 |

(Continued)

*Primary Examiner* — Fernando Alcon
(74) *Attorney, Agent, or Firm* — Tarolli, Sundheim, Covell & Tummino LLP

(57) ABSTRACT

In example embodiments, a system and method for dynamically scheduling advertising is provided. For example, an advertisement order that describes an advertising campaign in logical terms is received. Stored data of statistically sampled metrics associated with previously distributed programs may be accessed. Based on the stored data and requirements indicated in the advertisement order, the logical terms of the advertising campaign may be translated into physical parameters adapted to facilitate placement of advertisements into an advertising schedule. The physical parameters of the advertising campaign may be provided to a device for creating the advertising schedule.

18 Claims, 7 Drawing Sheets

(56) References Cited

U.S. PATENT DOCUMENTS

| | | | |
|---|---|---|---|
| 2008/0046924 A1* | 2/2008 | Hood | 725/36 |
| 2008/0271070 A1* | 10/2008 | Kanojia et al. | 725/32 |
| 2010/0095323 A1* | 4/2010 | Williamson | H04H 20/30 |
| | | | 725/32 |
| 2011/0078726 A1* | 3/2011 | Rosenberg et al. | 725/34 |
| 2012/0311649 A1* | 12/2012 | Patten et al. | 725/97 |
| 2014/0082660 A1* | 3/2014 | Zhang | H04N 21/258 |
| | | | 725/32 |

* cited by examiner

DYNAMIC SCHEDULING FOR ADVANCED ADVERTISING IN LINEAR TELEVISION

RELATED APPLICATION

The present application claims the priority of U.S. Provisional Patent Application Ser. No. 61/601,982, filed Feb. 22, 2012 and entitled "Dynamic Scheduling for Advanced Advertising in Linear Television," which is hereby incorporated by reference.

FIELD

The present disclosure relates generally to advertising, and in a specific example embodiment, to providing dynamic scheduling of advertising content.

BACKGROUND

Typically, advertisements are presented during breaks between video programming, such as television shows, series (or episodes of the same), movies or other entertainment whether broadcast, streamed, on-demand, or stored and played back (collectively referred to as "content"). Conventionally, determining how best to implement an advertisement campaign is manually intensive requiring humans to determine when, where, and a number of times one or more advertisements need to be placed.

BRIEF DESCRIPTION OF DRAWINGS

The appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments. It will be evident, however, to those skilled in the art that embodiments may be practiced without these specific details. In general, well-known instruction instances, protocols, structures, and techniques have not been shown in detail.

In example embodiments, a system and method for dynamically scheduling advertising is provided. In example embodiments, an advertisement order that describes an advertising campaign in logical terms is received. Stored data including statistically sampled metrics associated with previously distributed programs or other entertainment content may be accessed. Stored data may also include other information relating to how content has been viewed or consumed and also by whom (including information on viewer's characteristics). Based on the stored data and requirements indicated in the advertisement order, the logical terms of the advertising campaign are translated into physical parameters that are used to place advertisements of the advertisement order into an advertising schedule. The physical parameters of the advertising campaign are provided to a device for creating the advertising schedule. The device creates the advertising schedule based on rules that consider factors such as priority and flexibility. Both the physical parameters as well as the advertising schedule may be adjusted based on feedback used to track progress in satisfaction of the campaign goal.

Figure 1:
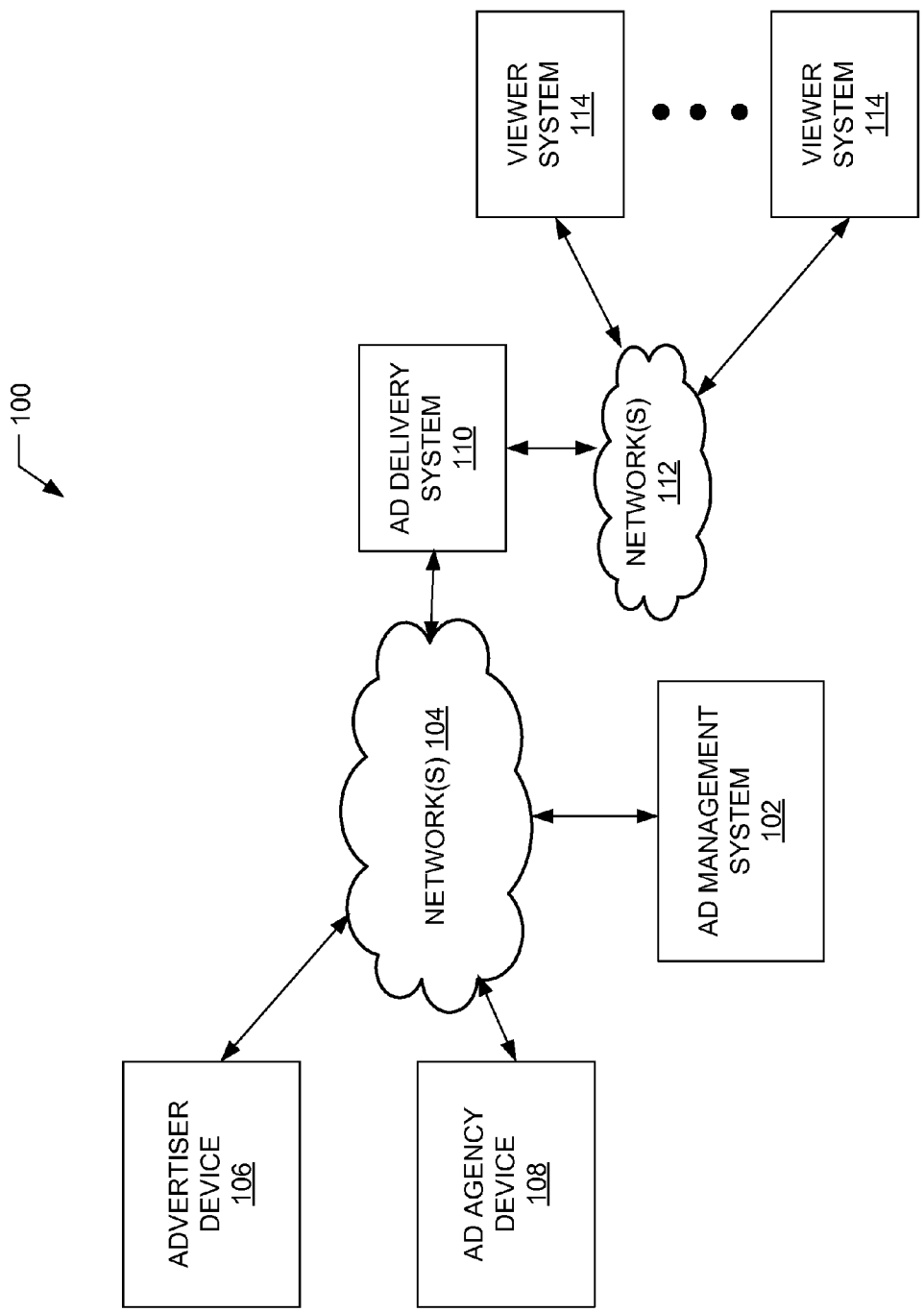
FIG. 1 is an example environment in which embodiments of the present invention may be practiced.

With reference to FIG. 1, an embodiment of an example environment 100 that enables dynamic scheduling of advertisements is provided. In example embodiments, an ad management system 102 is coupled via one or more communication networks 104 (e.g., the Internet, wireless network, cellular network, Bluetooth, Local Area Network (LAN), or a Wide Area Network (WAN)) to one or more advertiser device 106 and one or more ad agency device 108. The ad management system 102 manages schedule planning of advertisements, adaptive scheduling (e.g., placement) of the advertisements, and adjusting the scheduling based on feedback. The ad management system 102 also manages advertisements in on-demand (e.g., VOD, DVR, PVR) content display or playback. Schedule planning is a process of determining specific schedule variables based on logical advertising parameters provided by an advertiser. Note that logical terms and logical parameters may be used interchangeably. Adaptive scheduling is a process of placing advertisements from a plurality of advertisers into a programming schedule in an optimized manner based on various parameters and rules. The ad management system 102 will be discussed in more detail in connection with FIG. 2. As used herein (except where the context clearly requires a different meaning) "program" or "programming" (as in "programming schedule" but not "executable software program") refers to audiovisual content consumable by human users for entertainment, education, or similar purposes. By way of non-limiting examples such "programming" may include scripted or unscripted television shows (or series or episodes of the same), movies, sporting events, other performance events, or the like whether broadcast or not and whether consumed in a linear manner or not. "Programming" may refer to content consumed substantially passively or content with which the user/viewer interacts quite extensively. "Programs" may also be stored and replayed, either locally or remotely (from the user, as in stored in a network or "the cloud") or in fixed storage media (e.g., optical discs).

The advertiser device 106 is associated with an advertiser that desires to place their advertisements into the programming schedule. In some embodiments, the advertiser may, using the advertiser device 106, communicate directly with the ad management system 102 to place an order. In other embodiments, the advertiser may work with an ad agency to place the order. In these embodiments, the ad agency places the order with the ad management system 102 via the ad agency device 108.

Once the ad management system 102 creates an optimized advertising schedule, the optimized advertising schedule is transmitted to an ad delivery system 110. In some embodiments, the ad delivery system 110 accesses (from a stored database of advertisements) or receives the advertisement and inserts the proper advertisement into each advertisement slot in, for example, a linear television program schedule based on the optimized advertising schedule. The advertisements are then provided via one or more networks 112 (e.g., broadcast network) to a plurality of viewer systems 114. In some embodiments, the networks 112 may be the same as the networks 104. The ad delivery system 110 also logs a placement notification as proof that the advertisement was placed and delivered. In one embodiment, the ad delivery system 110 may comprise a headend.

The viewer system 114 comprises devices that enable a viewer to view, for example, entertainment content (e.g., programs or programming such as television shows, movies, pay-per-view) and advertising content. For example, the viewer system 114 may be a television, computer, or smartphone. The viewer system 114 may also include a controller device such as a set-top box. In embodiments with the controller device, the advertising schedule may be provided by the ad delivery system 110 to the controller device, and the controller device inserts the advertisements into the proper advertisement slots.

The environment 100 of FIG. 1 is merely an example. A skilled artisan will recognize that the present disclosure is not limited to such an architecture or environment 100. For example, it will be appreciated that in alternative embodiments any number of advertiser devices 106, ad agency devices 108, ad delivery systems 110, and viewer systems 114 may be coupled in communication. Additionally, any number of ad management systems 102 may be provides such that each ad management system 102 may be associated with a particular region.

Figure 2:
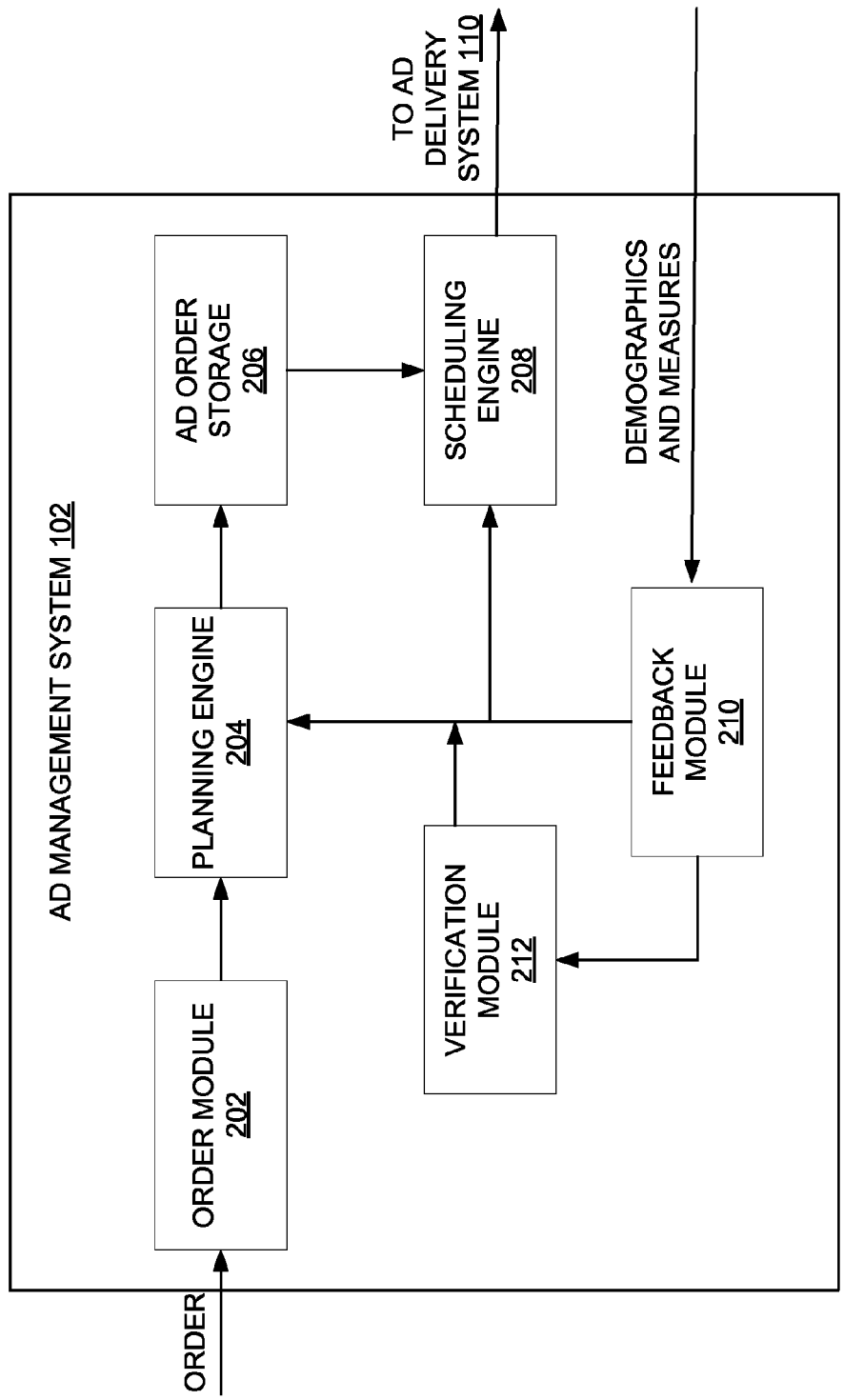
FIG. 2 is a detailed block diagram illustrating an example embodiment of an ad management system.

FIG. 2 is a detailed block diagram illustrating an example embodiment of the ad management system 102. The ad management system 102 manages schedule planning of advertisements (e.g., determining number of advertisements needed), adaptive scheduling (e.g., placement) of the advertisements, adjusting the schedule planning or the adaptive scheduling based on feedback, and advertisements in on-demand or other previous content display scenarios. To enable these operations, the ad management system 102 comprises an order module 202, a planning engine 204, an ad order storage 206, a scheduling engine 208, a feedback module 210, and a verification module 212 communicative coupled together. It is noted that not all modules or engines of the ad management system 102 may be used in various example embodiments and that functions of some modules or engines may be combined, divided into a plurality of modules or engines, or be made optional.

The order module 202 receives an order either from the advertiser via the advertiser device 106 or the ad agency via the ad agency device 108. The order is conveyed in logical requirements of an advertising campaign. That is, the advertising campaign may be expressed in terms of goals (e.g., the logical terms or parameters) for reaching a particular audience such as (or defined by), for example, geographic location (e.g., city), day of week, time of day (or range of times such as prime time), channel or television network (e.g., CNN) or group of channels or networks, specific programs (e.g., series, episodes, or the like), genre, break position (e.g., first advertisement, last advertisement), or demographics over a particular period of time (sometimes referred to as a "flight window"). For example, the campaign may desire to reach one million viewers between the ages of 18 to 34 in the New York area between January and May. In another example, the campaign may want to generate sales of 100,000 CDs for Artist X.

The campaign may also include exclusivity (e.g., should be the only car advertisement during the commercial break) or may include "bookends" (e.g., two advertisements shown in a specific sequence in the same commercial break). Additionally, the campaign may include exclusions (e.g., a product may not be suitable for showing during children's programming) and rotation rules (e.g., to avoid consumer fatigue, advertisements form a given advertiser may be rotated to avoid always showing he same advertisement to a given audience). In some cases, performance requirements may be included in the campaign. The performance requirements may be as simple as requiring the advertisement be shown a certain number of times in positions meeting all the specifications, or more sophisticated proposals including audience size or demographic metrics based on statistically sampled metrics, for example, provided by companies such as A.C. Nielsen ("Nielsen ratings"). Furthermore, the advertiser may have preference about the rate of delivery versus time. For example, the advertiser may want an even distribution of audience during the campaign period (e.g., 100,000 impressions per day for 10 days), or the advertiser may want heavier advertising on Fridays or at the beginning (or end) of the campaign in order to match other promotional activities or known consumer shopping patterns. These are the logical terms or parameters of the order as well as business rules that are applicable in the placement of the advertisements.

The order is then provided to the planning engine 204. The planning engine 204 takes the logical parameters of the order and translates the logical parameters into physical parameters (e.g., specific schedule variables). For the New York campaign example, the planning engine 204 may determine that 30 slots between the hours of 8 pm-11 pm on NBC on Monday and Wednesday (e.g., the physical parameters are 30 slots between 8 pm-11 pm on NBC on Monday and Wednesday) may satisfy the logical parameters. Alternatively with the CD campaign example, the planning engine 204 determines that on average (or some other calculation) it takes five fans viewing an album advertisement to sell one CD. As a result, the album advertisement should be shown to 500,000 fans. Those fans may be watching a particular show on CBS on Saturday morning (based on the statistically sampled metrics that indicate demographics). As a result, the physical parameters may be 20 advertisements over six weeks during Saturday morning on CBS. Thus, the planning engine 204 may take a formula based on sales data and turn the CD campaign into physical advertising parameters. These physical parameters may indicate, for example, number of advertisements required to satisfy the campaign goal along with channels, networks, shows, times, days, platforms (e.g., linear television, pay-per-view), and duration. The planning engine 204 will be discussed in more detail in connection with FIG. 3.

Once the planning engine 204 determines the physical parameters of the order, the physical parameters of the order (sometimes referred to as "order lines) are stored in the ad order storage 206. The ad order storage 206 essentially comprises a backlog of unplaced advertisements from a plurality of advertisers and ad agencies.

The scheduling engine 208 optimizes the placement of the unplaced advertisements in the ad order storage 206. For example, the scheduling engine 208 may create an advertising schedule in advance for linear television or may dynamically create the advertising schedule in real-time for placement requests in on-demand playback. The scheduling engine 208 then transmits the advertising schedule to the ad delivery system 110. The scheduling engine 208 will be discussed in more detail in connection with FIG. 4.

The feedback module 210 receives feedback regarding the playing of the advertisements. For example, the viewer system 114 (e.g., a set-top box in the system) may generate logs when each advertisement is displayed. The viewer system 114 may also log clicks or other actions performed by the viewer viewing the advertisement. The logs of playing of the advertisement and actions performed by the viewer as well as viewer demographics are transmitted to the feedback module 210. The feedback module 210 may also receive the logs of placement notifications from the ad delivery system 110. Furthermore, feedback from other external sources may be received by the feedback module 210. For example, Nielsen ratings may be received from a device associated with the Nielsen Company and product sales information may be received from devices associated with stores (e.g., based on loyalty cards providing user identity and products purchased) or the advertiser of the product.

The feedback may be processed by the feedback module 210 and provided to the planning engine 204 and the scheduling engine 208 to refine the schedule planning and the adaptive scheduling of advertisements. As such, the planning engine 204 may revise the physical parameters of an order (e.g., 10 additional advertisements during Friday night between 8 pm to 10 pm), and the scheduling engine 208 may rearrange the advertisement placement or prioritize some advertisements higher for placement as will be discussed in more detail below.

The feedback is also provided to the verification module 212 to verify that the order is being satisfied. The verification module 212 performs a post processing operation to translate the results of the airing of the advertisement into numbers that are significant to the advertiser. In essence, the verification module 212 may perform a reverse operation of the planning engine 204 to translated physical parameters of the measurements that are logged into logical terms that are comparable to the logical terms of the initial advertisement order. For example, based on the Nielsen ratings, the verification module 212 can determine that 800,000 viewers between the ages of 18 to 34 in the New York area between January and April saw the advertisement. These logical terms may be compared to the logical terms in the campaign to determine whether the goal is achieved or is on track to be achieved (e.g., progress in satisfaction of campaign goal). In this example, the ad management system 102 has one more month to show the advertisement to 200,000 viewers to satisfy the New York campaign. In some embodiments, payment may be based on the results determined by the verification module 212. That is, the verification module 212 can show whether the contract (e.g., order) was fulfilled by matching the logged feedback with the orders. The verification module 212 can then give the customer/advertiser an affidavit or proof of satisfaction of the order.

In another example, assume that the advertiser wanted to reach 1 million Singer Y fans. Based on past viewer demographics, an assumption is made that particular people that watch television on Saturday mornings are Singer Y fans. After broadcast of the advertisements, a review of Nielsen ratings or feedback from set-top boxes may be received by the feedback module 210 and provided to the verification module 212. Alternatively, the set-top box may indicate additional information such as a response, tweet (e.g., about the Singer Y), or purchase made (e.g., of a CD by Singer Y) by the viewer. Thus, the verification module 212 receives direct verification (e.g., station showed the advertisement at this time) or precise verification (e.g., this household viewed that advertisement). There are other manners, such as similar to a currency exchange process, that the feedback may be extrapolated to determine that the advertiser got a certain audience. For example, a certain number of tweets from fans of Singer Y may be extrapolated by the verification module 212. Alternatively, viewers clicks on an indicator that indicated they are interested in a chance to win Singer Y tickets may be extrapolated to determine whether the campaign goal is or will be reached.

Figure 3:
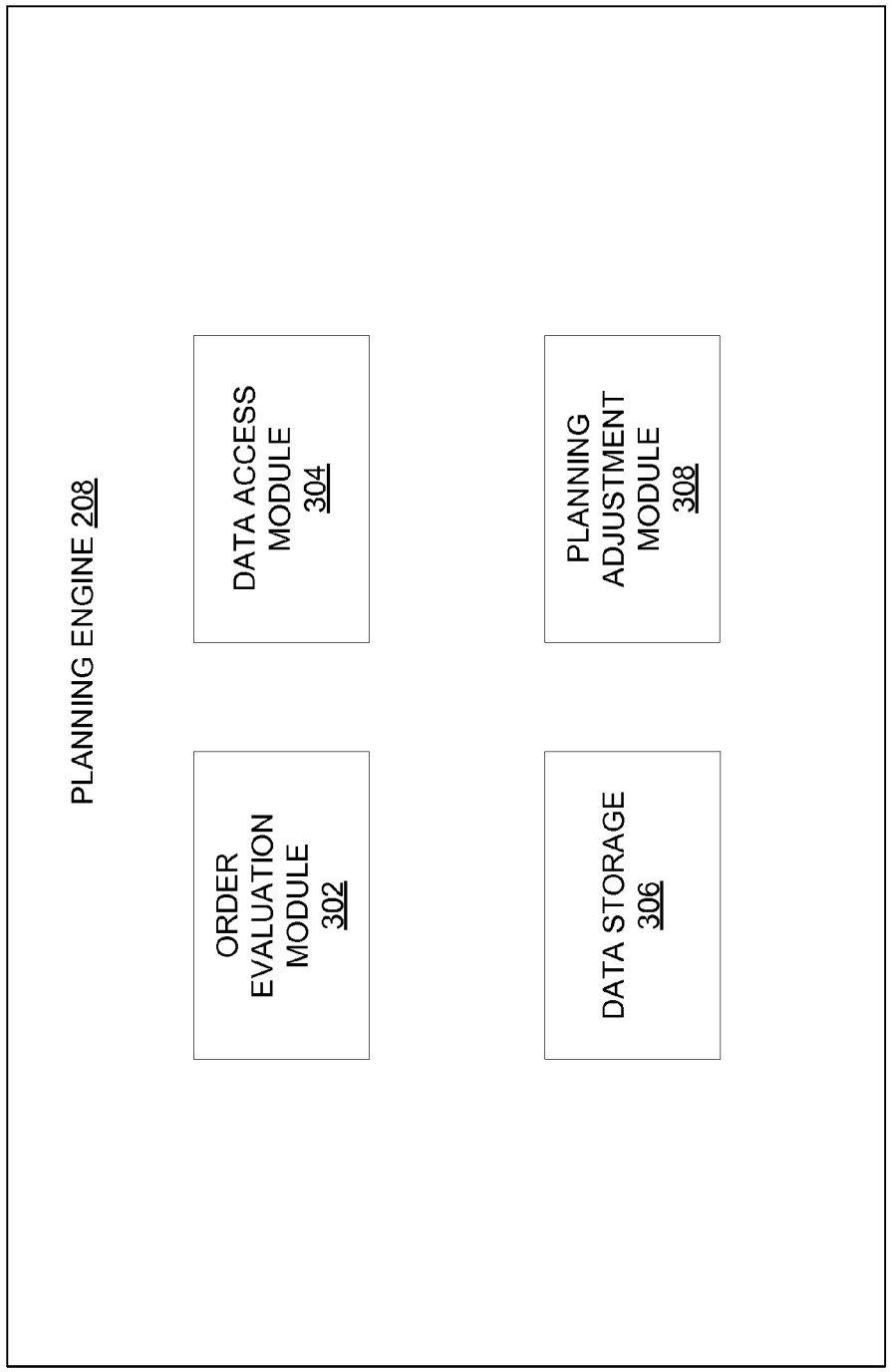
FIG. 3 is a block diagram illustrating an example embodiment of a planning engine.

Referring now to FIG. 3, a block diagram of an example embodiment of the planning engine 208 is shown. The planning engine 208 takes the logical parameters of an order received by the order module 202 and translates the order into physical parameters that are used to adaptively place the advertisements into an advertising schedule. To enable this operation, the planning engine 208 comprises an order evaluation module 302, a data access module 304, a data storage 306, and a planning adjustment module 308.

The order evaluation module 302 translates the initial campaign goals of the order into concrete, physical terms or parameters. For example, the campaign may desire to reach one million viewers between the ages of 18 to 34 year-olds in the New York area from January through May. The campaign may also specify other requirements or rules that may affect the schedule planning and include product information. For example, the campaign may specify particular times, dates, or networks the advertisements should be presented.

The order evaluation module 302 receives these logical parameters and requirements, and triggers the data access module 304 to access the data store 306 to retrieve stored data including statistically sampled metrics that include program information and ratings that indicate audience size or demographic metrics. The sampled metrics provide the order evaluation module 302 values against which the logical parameters of the order may be evaluated against. For example, the ratings give the order evaluation module 302 the percentage of a population demographic in a given area for a given show. Furthermore, the information on the given show indicates a channel (e.g., network) and time. Using the sampled metrics, the order evaluation module 302 translates the logical parameter into the physical parameters. For example, a number of impressions expected by the campaign goals divided by the estimated ratings per demographics for the program or channel and day gives the number of advertisements needed to be played to achieve the campaign goal as an initial setting.

For example, a tool advertiser places an order for one million impressions (e.g., views) over one week targeted at men 18-55 who are do-it-yourselfers in the Los Angeles area. The order evaluation module 302 uses stored commercial ratings/surveys (e.g., sampled metrics) to identify programs whose genre correlates with DIYers (e.g., home improvement programs such as Extreme Home Makeover). As Los Angeles is further subdivided into advertising zones, the order evaluation module 302 may identify (or access sampled metrics regarding) those zones that have higher household incomes and/or higher percentage of existing home sales (e.g., most likely to have owners that want to do some remodeling). Based on these zones, the order evaluation module 302 reviews expected target audience sizes for various programs in the Los Angeles area in different time slots/channels. If this information is available by zone, the order evaluation module 302 may use those metrics directly. If not, the order evaluation module 302 may use synthesized estimates from the Los Angeles area as a whole using a combination of Los Angeles area ratings and population (or target population) shares in each of the identified zones. It is also possible that different shows carry different weights, even with equivalent target audience shares, possibly based on known propensities to buy a given product for an audience of that show.

The conversion from campaign parameters or objectives to logical parameters (e.g., order lines) may span multiple ad management systems 102. For example, it may take two or more ad management systems 102 to cover a large area.

While embodiments have been discussed generally with respect to linear television, it is noted that the advertisements may be placed across different platforms. For example, the advertising campaign may include television, movies, banner ads (e.g., online), and pay-per-view. The order evaluation module 302 may then load balance the campaign against the different platforms. Thus, the order evaluation module 302 may address multimedia schedules and balance between them. In these embodiments, each type of platform may have a weight compared to other platforms.

Thus, there may be more than one inventory type of advertisement, such as linear broadcast and on-demand (DVR or PVR) advertisements. The order evaluation module 302 may use a cross-platform conversion process, based on weights/rules that express the relative value of each platform in some common metric. For example, an advertiser may feel that a PVR ad impression has 3.5× the value of a linear broadcast preference, or that a banner ad in the electronic programming guide (EPG) has 0.2× the value of a linear broadcast advertisement. The translation process may take into account relative advertising costs, as well as advertiser guidelines on the ad mix (e.g., 20% of the budget spent on banner, 50% spent on broadcast, and 30% spent on on-demand). Additionally, campaign balancing may occur across different ad lengths (e.g., a 15 second version of the advertisement may be judged to be 60% as effective as a 30 second version). Thus, the campaign balancing may occur within the same platform. The conversion process may include conversion factors to create the order line (e.g., physical parameters) based on target product sales and historical product sales data by area.

For initial campaign planning across multiple inventory types, a combination of reduction to a common basis (e.g., using logic and weights) and taking into account both objectives and costs, a mix of inventory types may be determined that optimizes the number of "impression equivalents" for a given cost using standard optimization techniques. For example, if a linear advertisement has a weight of WL and a cost of CL, with a VOD (video-on-demand) advertisement having a weight of WV and a cost of CV, and an EPG (electronic programming guide) banner advertisement with a weight WB and a cost CB, standard optimization techniques such as linear programming can be used to find an optimal number of advertisements of each type to meet the cost objective. Other constraints may apply, such as a number of banner advertisements cannot exceed a certain amount, a minimum number, or percentage.

Thus, the order evaluation module 302 (and the planning adjustment module 308) uses a logic and weight approach that can apply different weights to different situations, different advertisers, different channels, or different times of day or days) for example. The logic may be modified to allow for a flexible estimation process that can adapt to business requirements and change over time. For example, scripting language (e.g., Javascript) may be modified and used without changing the underlying program. It is noted that it is not always possible to use a simple weighting scheme. For example, if both direct measurements and insertion/audience metrics are available for a given area, the advertiser may specify that only the audience metrics be used. Thus, the order evaluation module 302 processes such requirements to derive a mutually agreeable estimate of impressions.

After the translation of the initial campaign goals of the order, feedback received from measurement module 210 and/or the results from the verification module 212 may be used by the planning adjustment module 308 to adjust the physical parameters of the order. For adjustments during the campaign, actual ratings are used to translate the results achieved thus far and compare them to the campaign goal for the time elapsed. The planning adjustment module 308 may automatically adjust the order lines (e.g., physically parameters) to reflect actual performance objectives achieved. For example, if the placement of the first 30 advertisements did not result in enough people watching so as to satisfy the campaign goal (e.g., smaller audience than predicted), the planning adjustment module 308 may raise the number of advertisements to 40 (e.g., add 10 additional advertisements).

The planning adjustment module 308 may adjusted across platforms and areas. For example, if impressions on one system (e.g., ad management system) covering east of the Mississippi are below a target, some of the remaining inventory may be moved to a system (e.g., a different ad management system) covering west of the Mississippi. The shift between areas may be based on weighting. For example, advertisements placed in zones between X and Y miles from a target zone may be assigned a lower weight if the advertiser believes that those more distant customers are less likely to visit a store to buy the product. In another example, if more viewers are watching the on-demand version of the program than the linear television version, some of the remaining inventory may be moved to on-demand advertising. Thus, the weight and logic approach allows the advertisers to specify limits on the mix of inventory type (e.g., a number of television advertisements to on-demand substitutions cannot exceed a certain percentage of the impressions or budget). Default logic may be incorporated into the planning adjustment module 308 or scripting language may be incorporated to allow creation of new logic/weighting rules to meet customer requirements.

Further still, adjustments may be made across different content delivery types. For example, advertisement in content being delivered on mobile devices (e.g., via a live stream) may be given more weight as the personal nature of the mobile device may make advertisements more effective in that context. Therefore more advertisements may be shifted to content being delivered to mobile devices. In some embodiments, the functions and operations of the planning adjustment module 308 may be combined into and performed by the order evaluation module 302.

Figure 4:
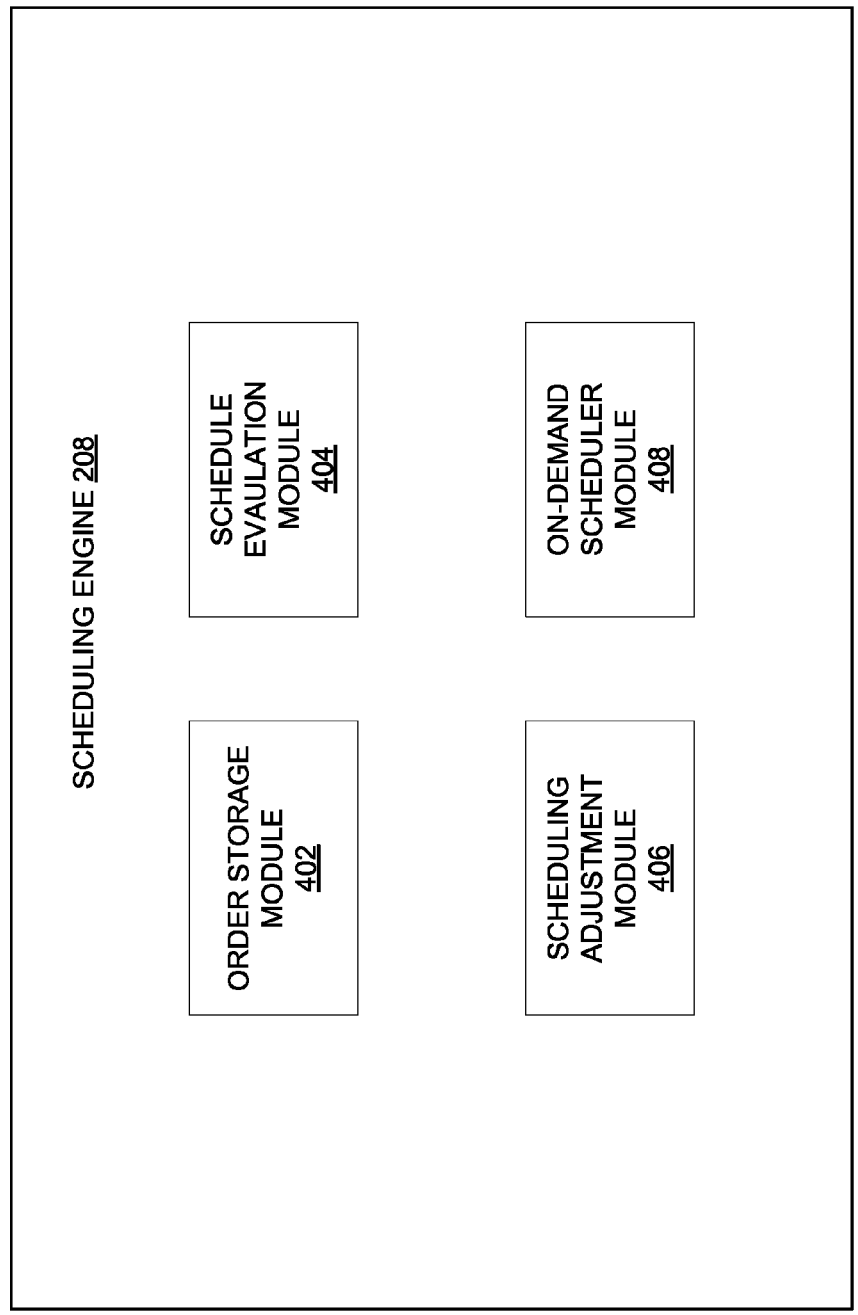
FIG. 4 is a block diagram illustrating an example embodiment of a scheduling engine.

FIG. 4 is a block diagram illustrating an example embodiment of the scheduling engine 208. The scheduling engine 208 optimizes the placement of the unplaced advertisements from a plurality of advertisers and creates an advertising schedule for each platform. To enable this operation, the scheduling engine 208 comprises an order storage module 402, a schedule evaluation module 404, a scheduling adjustment module 406, and an on-demand scheduler module 408.

The order storage module 402 accesses the ad order storage 206 to retrieve the backlog of unplaced advertisements along with any rules or requirements (e.g., advertiser wants particular times, channels, or platforms). Once accessed, the schedule evaluation module 404 uses different business rules to select between competing candidate orders (e.g., unplaced advertisements) to fill placement opportunities (e.g., advertisement slots in linear television known in advance or dynamic placement opportunities in on-demand when a viewer plays recorded content). The business rules include algorithms provided to the schedule evaluation module 402 that represent weights and priorities of chosen parameters. Therefore, the aggregate of all the orders that are open (e.g., unplaced advertisements) are accessed by the schedule evaluation module 404 which includes requests for various days and times for advertisement placement.

The schedule evaluation module 404 rationalizes the advertisement spots that are available against the inventory of unplaced advertisements to constantly build advertising schedules for a number of days or weeks in advance. The schedule evaluation module 404 may run on a regular basis to create and update the advertising schedule for each day in a configured number of weeks. For each iteration, the schedule evaluation module 404 accesses newly approved order lines (e.g., unplaced advertisements) as well as previously unplaced advertisements and attempts to place them. The scheduling is dynamic since it is iterative and incrementally attempts to place any unplaced advertisements in the advertising schedules over the course of many days or weeks in advance.

In example embodiments, priority (e.g., which ads are most important to put in the schedule first), which may be dynamic, is one factor used by schedule evaluation module 404 for determining placement. The priority may include an order priority assigned by a sales force (e.g., an employee of the ad management system 102). In some embodiments, the schedule evaluation module 404 may adjust the quantities and priorities of the advertisements to be placed to fulfill the goals of the campaign. For example, an advertiser may set the campaign goals for each advertisement and then select certain order parameters based on those goals. The schedule evaluation module 404 then dynamically places the orders based on the user defined parameter weights. For instance, in one example, the amount paid for an advertisement may have a higher priority than the time placement or regional placement of the advertisement. So when the schedule evaluation module 404 places the advertisement orders within the fixed number of spots, the schedule evaluation module 404 may try to ensure that the highest priority (based on parameters) and highest paid advertisements are placed first. The advertiser may indicate, in their order, which parameters receive higher priority or weight.

Additionally, priority may be computed by the schedule evaluation module 404. In some cases, the schedule evaluation module 404 uses a set of business rules that take into account multiple parameters to calculate priority in scheduling. The business rules may be configured by the advertiser or the ad management system 102. These business rules may consider, for example, a value placed on particular advertisement (e.g., revenue expected from the advertisement placement), value of a relationship (e.g., revenue for the campaign), or a value of a total ad relationship with a particular customer/advertiser in a particular period of time (e.g., current year), aggregated business done with the advertiser or ad agency, or previous success rate at placing advertisements for a campaign or advertiser. In other words, the priority may be weighted by certain aspects of the advertisement or business relationship with the advertiser (e.g., spot revenue, order revenue, customer revenue, performance up to date). Other business rules may be used in determining the priority.

The schedule evaluation module 404 may also use business rules directed to flexibility in determining placement of the unplaced advertisements. For example, one advertisement may have a very high priority, but can be placed anywhere between 5 pm-10 pm on Friday. Another advertisement has a lower priority, but can only be placed from 7 pm-8 pm on Friday. In this situation, the advertisement with the lower priority may bump the advertisement with the higher priority since the advertisement with the higher priority is more flexible. Thus, a more flexible advertisement, even if it has a higher priority by other measures, may yield its advertisement spot to a lower ranged advertisement since the more flexible advertisement may be placed in another spot more easily.

The schedule evaluation module 404 may consider other business rules in determining placement such as time in the order. That is, priority may be adjusted based on percentages of the order having been executed relative to percentage of time left in the campaign. Campaigns that are "behind schedule" may have the priority of their unplaced advertisements elevated, while those that are "ahead of schedule" may have their priority reduced. For example, if an order for an advertiser indicates that 40 advertisements should be placed and the period of time to satisfy the order is nearing the end, the priority may be changed. Thus, this advertisement may be pushed higher than other advertisers with higher priorities based on other factors (e.g., paid more money, has a longer term contract). The mix and weight of the various factors, priorities, and business rules may also be configurable by an operator of the ad management system 102.

The business rules may also consider an advertisement separation parameter. For example, two competing car commercials will not appear one after the other or within the same commercial break during a program. Business rules may also evaluate uniform placement of an advertisement in a region where the advertisement is displayed at the same or nearly the same time in different headends. By assigning a priority or weight to each business rule, the advertiser is able to leverage which business rules have more influence than others and which parameters are more important in placing the advertisement. Thus, the advertiser may tailor the behavior of the schedule evaluation module 404 through selection of certain business rules and their weight. Additionally the advertiser may also change the set of rules and their relative weights and priority from time to time based on such factors as new marketing or sales criteria. The schedule evaluation module 404 takes all of this into consideration when generating the advertising schedule.

The scheduling adjustment module 406 may adjust an advertising schedule based on feedback. For example, an advertisement may be placed into a spot on Monday night at 8:15. However, a special news report may have preempted any showing of advertisements between 8:10-8:20. Based on feedback received by the feedback module 210 and provided to the scheduling engine 208, the scheduling adjustment module 406 will realize that the advertisement was not played at the proper time, and may adjust a future advertising schedule to accommodate the advertisement.

In example embodiments, the scheduling adjustment module 406 attempts to "make good" on the order. In some embodiments, a "make good" may be a credit for an advertising spot that is given to an advertiser to make up for an error or unavoidable cancellation on the part of the broadcast medium. The credit may be in the form of a rerun of the advertisement in a different advertising spot. In some embodiments, the order may indicate what the advertiser considers to be an acceptable make good opportunity. For example if an advertisement was to be placed in a certain slot but failed to air during the specified spot, a verification system (e.g., the verification module 212) may instruct the scheduling adjustment module 406 to use an acceptable make good opportunity. Whether or not an advertisement will be placed using the make good opportunity is determined by the advertiser when the order was originally placed. In such a case, the advertiser has an option to select alternate slot placement of their advertisement. In one example of this embodiment, the advertiser may receive multiple make good spot opportunities. The opportunity to use the make good alternative occurs in instances where there are no more placement opportunities within the originally requested parameters, such as an inventory sells out or having passed line dates. Additionally where advertisement placement feedback is available in real-time or near real-time, the verification system may process the results in real time and instruct the scheduling adjustment module 406 to either replace the advertisement originally ordered or place the instructed make good opportunities as early as possible.

While some embodiments have been discussed herein with respect to linear or broadcast television examples or distribution platforms, it is by no means intended to so limit the disclosed inventions. Indeed, those skilled in the art will note that the disclosed inventions are substantially platform independent. The reader should note that the advertisements may be substituted across different platforms by the scheduling adjustment module 406. For example, the advertiser may purchase a package of advertisements (e.g., place an order) for advertising on linear television. However, if certain advertisements cannot be aired during television airing of a program X, but placing the advertisement on a pay-per-view version of program X will give equivalent demographics, the placement on the pay-per-view may be substituted for the television version. This is adaptive across different inventory types or different platforms. It is noted that the substitution is not necessarily one-to-one. For example, the pay-per-view placement may be better than the original television placement (e.g., more viewers), so the pay-per-view placement substitutes for two original television placements. Alternative, it may take three pay-per-view placements to equal one Monday night broadcast placement. Essentially, advertisement placement may be exchanged in a manner similar to currency exchange. In example embodiments, this form of advertisement substitution is used when agreed upon between the business partners (e.g., the advertiser and the ad management system 102).

The example embodiment of the scheduling engine 208 was discussed as having a separate schedule evaluation module 404 and scheduling adjustment module 406. However, it is noted that in some embodiments, the functions and operations of the scheduling adjustment module 406 may be incorporated into the schedule evaluation module 404.

The on-demand scheduler module 408 manages advertisement placement for on-demand content playback (e.g., via digital video recording (DVR) or personal video recording (PVR)) and operates as an ad decision system for on-demand playback. When something is recorded on behalf of a customer, during a certain period of time, the program provider may be bound to play the same commercial as on linear television. Thus, for example, when a viewer watches a recorded program within three days of when the program originally aired or was distributed, the viewer may get the recorded advertisement (e.g., the same advertisement as that shown during linear television), and credit may be given for showing the recorded advertisement (e.g., credit given to the ad management system 102). If the viewer records the program, an inserter (e.g., set-top box) places the advertisement in the proper advertisement slot. If the viewer uses network recording, the network may recreate the insertion in playback.

However, if the viewer watches the program after three days, there may be no credit given for showing the recorded advertisement. In this example, if no credit is to be given after three days, the on-demand scheduler module 408 may substitute a different advertisement for the recorded one. As such, the ad management system 102 can essentially sell the advertisement slots for any on-demand playback past three days of original airing of the program in this example. This provides the ad management system 102 extra places to place advertisements. Therefore, the on-demand scheduler module 408 may dynamically create the advertising schedule in real-time for placement requests in on-demand playback. It is noted that since these advertisement slots are now available, the planning engine (e.g., the order evaluation module 302) includes these on-demand advertising slots in determining the physical parameters of an order.

It is noted that the substitution by the on-demand scheduler module 408 is not limited to VOD, PVR, or DVR embodiments but an apply to other recorded media. For example advertisements may be included in an original recording on a Blu-ray disk. Some Blu-ray players have the potential to play alternative advertisements that have been downloaded and stored in the player if the player is network enabled (or streamed in with high enough quality connection). In these cases, the original advertiser may have an agreement with the content distributor that allows the distributor to replace the advertisements after a specified period of time. In another example, advertisements may be replaced after a specified period of time in video games.

Furthermore, the replacement advertisement does not necessary have to be from a second advertiser. For example, the original advertisement may be time sensitive (e.g., promotion for a release of a new product). The advertiser may want that time sensitive advertisement to be replaced by another advertisement once the new product has been on the market for some period of time.

Figure 5:
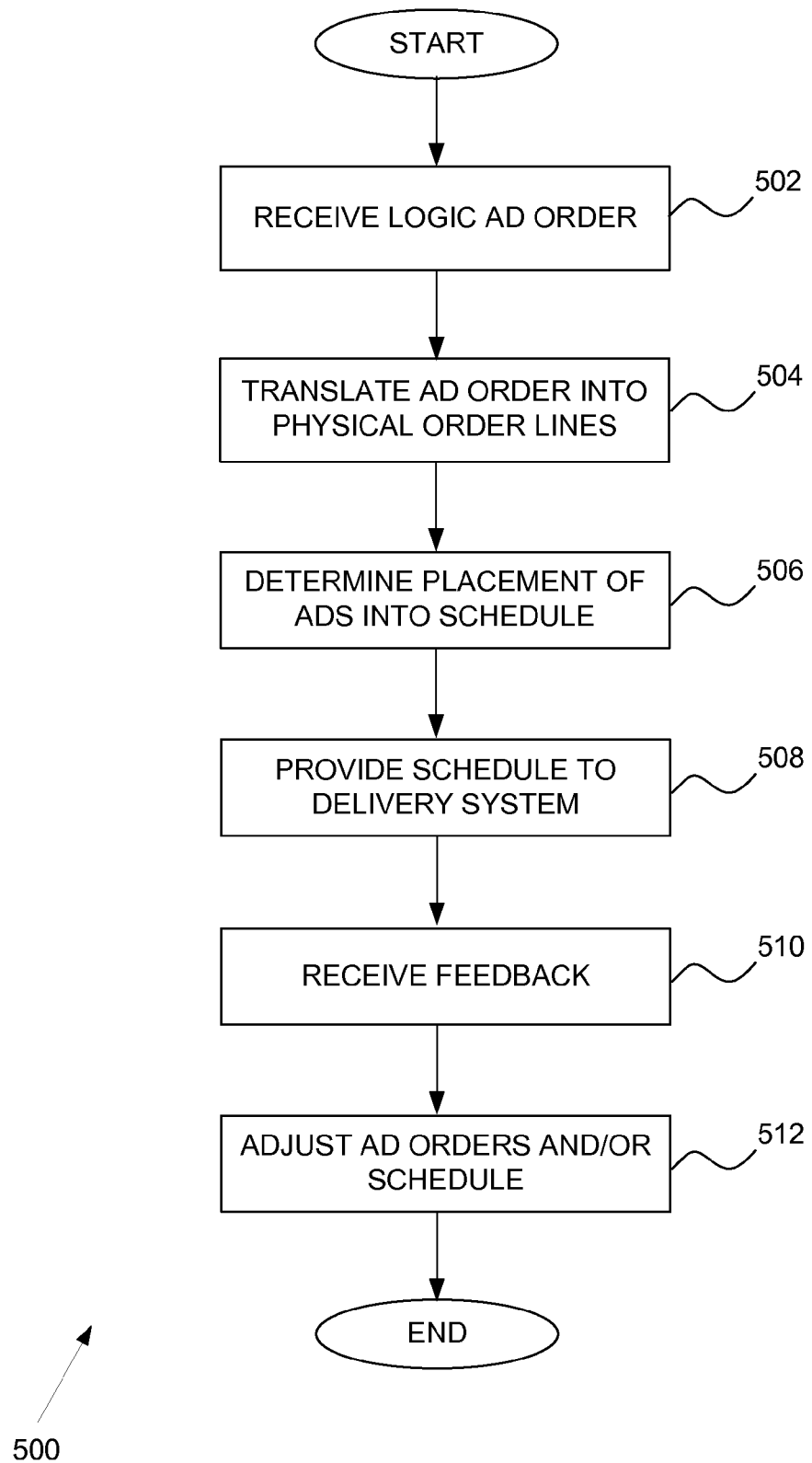
FIG. 5 is a flow diagram illustrating an example method for providing dynamic scheduling in linear television.

FIG. 5 is a flow diagram illustrating an example method 500 for providing dynamic scheduling in linear television. In operation 502, an advertisement order is received. The order module 202 receives the advertisement order either from the advertiser via the advertiser device 106 or the ad agency via the ad agency device 108. The order is conveyed in logical requirements of an advertising campaign.

In operation 504, the logical requirements or parameters of the order is translated into physical parameters also referred to as "order lines." In example embodiments, the order evaluation module 302 translates the initial campaign goals of the order into concrete, physical terms or parameters. The order evaluation module 302 receives the logical parameters and requirements, and triggers the data access module 304 to access the data store 306 to retrieve stored data such as ratings and demographic information. The ratings and demographic information provide the order evaluation module 302 values against which the logical parameters of the order may be evaluated against to translate the order into the order lines.

In operation 506, the scheduling engine 208 optimizes the placement of the unplaced advertisements into advertising schedules. For example, the scheduling engine 208 may create an advertising schedule in advance for linear television or may dynamically create the advertising schedule in real-time for placement requests in on-demand playback. The scheduling engine 208 then transmits the advertising schedule to the ad delivery system 110.

In operation 510, feedback is received by the feedback module 210. The feedback may include logs of when each advertisement is played, as well as clicks or other actions performed by the viewer viewing the advertisement from the viewing. The feedback module 210 may also receive the logs of placement notifications from the ad delivery system 110. Furthermore, feedback from other external sources may be received by the feedback module 210. For example, Nielsen ratings may be received from a device associated with the Nielsen Company and product sales information may be received from devices associated with stores or the advertiser of the product.

In operation 512, the advertisement orders (e.g., order lines or physical parameters) or the placement of the advertisements in the advertising schedule may be adjusted based on the feedback. The planning engine 204 may revise the physical parameter of an order (e.g., 10 additional advertisements during Friday night between 8 pm to 10 pm), while the scheduling engine 208 may rearrange the advertisement placement or prioritize some advertisements higher for future placement.

Figure 6:
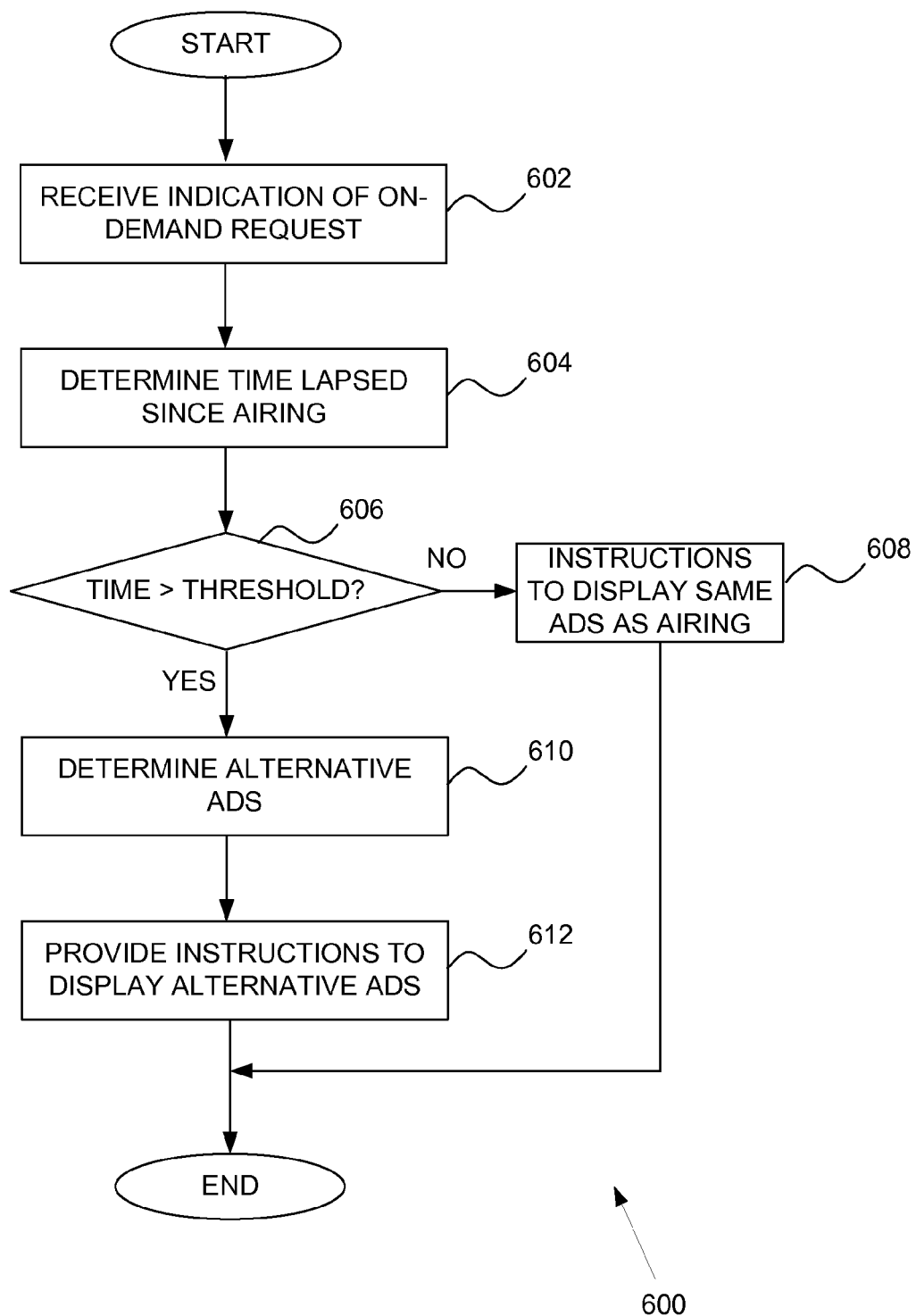
FIG. 6 is a flow diagram illustrating an example method for providing ads in an on-demand environment.

FIG. 6 is a flow diagram illustrating an example method 600 for providing ads in an on-demand environment. In example embodiments, the operations of the method may be performed by the on-demand scheduler module 408. When a viewer requests on-demand playback, the indication is received in operation 602.

In operation 604, the time lapsed since the original airing of the requested content, and hence the time since the content was recorded, is determined. In some embodiments, the on-demand scheduler module 408 may record or access a record of the linear advertising schedule for a number of days after the advertisements have aired in real-time in linear television.

Using that determined time, a determination is made in operation 606 as to whether a time threshold is exceeded. In one example embodiment, the time threshold is three days. In such embodiments where the time has not exceeded the time threshold, the advertisements that were displayed during the original airing of the content should be displayed. As such, instructions to display the same advertisements are provided in operation 608. Subsequently, an inserter (e.g., ad delivery system 110), broadcast network, or controller device (e.g., set-top box) places the advertisement in the proper advertisement slot. In a classic DVR embodiment, the advertisement may be added at a headend (or set-top box) in linear television and is recorded by the viewer with the program. The advertisement may be stored in advance in the DVR and placed at the correct time slot based on cues which point to the appropriate time in the program for the advertisement. When recording the program, the DVR records the live program plus the cue. Thus, during DVR playback, the cue leads to the same advertisement which was inserted during the real-time linear airing and the advertisement from the DVR storage is inserted. In network PVR or on-demand catalog embodiments, the playback of the advertisements to the subscriber is done by the on-demand equipment in the headend. For example, the program and targeted advertisement play from video servers in the headend for a specific viewer.

However, if the time exceeds the time threshold in operation 606, then the on-demand scheduler module 408 in such embodiments determines one or more substitute advertisements to place in the advertising slots that are available during playback in operation 610. In these cases, the on-demand scheduler module 408 dynamically creates the advertising schedule in real-time for placement requests in on-demand playback. Once the advertising schedule is created, the instructions to display the advertising schedule containing the substitute advertisements are provided to the ad delivery system 110 or other device responsible for obtaining and inserting the substitute advertisements (e.g., the broadcast network, the controller device).

Figure 7:
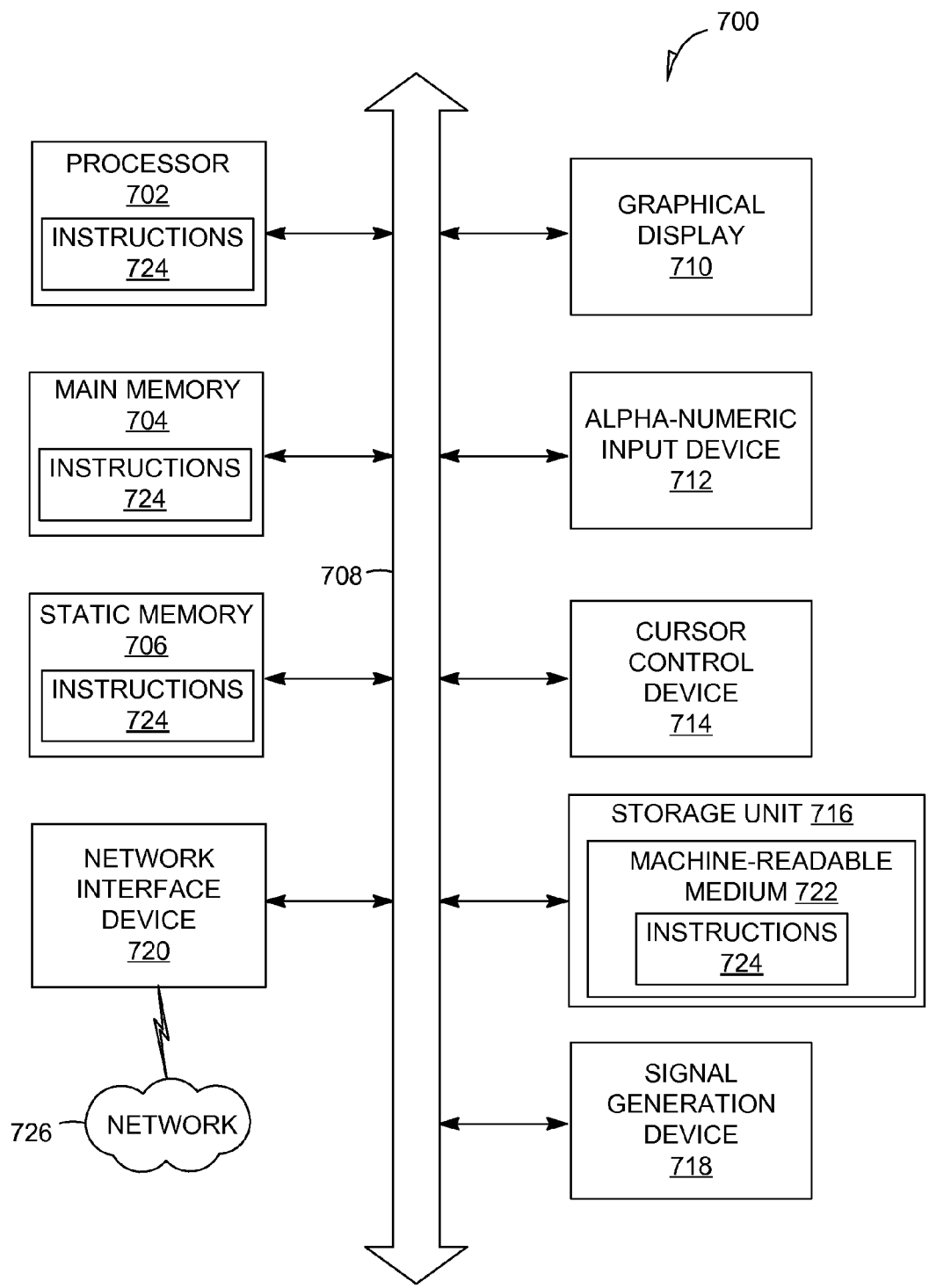
FIG. 7 is a simplified block diagram of a machine in an example form of a computing system within which a set of instructions for causing the machine to perform any one or more of the methodologies discussed herein may be executed.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system and within which instructions 724 (e.g., software, a program, an application, an applet, an app, or other executable code) for causing the machine 700 to perform any one or more of the methodologies discussed herein may be executed. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alpha-numeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A processor-implemented method comprising:
receiving, at an advertisement management system, an advertisement order that describes an advertising campaign in logical terms, wherein the advertising order comprises a plurality of advertisements, each associated with a priority parameter;
accessing stored data of statistically sampled metrics associated with previously distributed content;
based on the stored data and requirements indicated in the advertisement order, translating, by a processor of a machine, the logical terms of the advertising campaign into physical parameters to place at least a portion the advertisements of the advertisement order into an advertising schedule based on the associated priority parameter;
creating the advertising schedule comprising at least the portion of the advertisements to satisfy a portion of the advertising order based on the physical parameters;
receiving feedback regarding playing of the at least the portion of the advertisements from the advertisement order in the advertising schedule from at least one external source;
determining progress of the advertising campaign based on the feedback; and
dynamically placing remaining advertisements of the advertisement order into the advertising schedule for use in an on-demand playback environment based on the associated priority parameter and a percentage of the advertisement order having been executed relative to a time left to satisfy the advertisement order.

2. The method of claim 1, wherein the providing comprises storing the physical parameters of the advertising campaign as order lines in an advertisement order storage that maintains a database of unplaced advertisements.

3. The method of claim 1 further comprising:
tracking the progress of a campaign goal of the advertising campaign using the feedback.

4. The method of claim 3, wherein the feedback includes at least one of a log of actions performed by viewers related to the viewing of the advertisement, a log of placement notifications, or a log indicating actual display of the advertisements.

5. The method of claim 1, wherein the automatically adjusting, by the advertisement management system, comprises reallocating at least some advertisements in the advertising schedule to at least one of a different platform or different region.

6. The method of claim 1, wherein the translating comprises using a cross-platform conversion process to determine physical parameters that indicate placement of the advertisements across different platforms, each platform having a weight that expresses a relative value for each platform compared to another platform.

7. The method of claim 1, wherein the creating comprises applying a flexibility rule that overrides the priority parameter in placing the remaining advertisements in the advertising schedule, the flexibility rule causing a higher priority advertisement having higher placement flexibility to yield an advertisement spot to a lower priority advertisement having lower placement flexibility.

8. The method of claim 1, further comprising adjusting the advertising schedule based on feedback indicating that at least one advertisement was not properly displayed.

9. The method of claim 1, wherein the content comprises previously broadcast television series episodes.

10. A non-transitory machine-readable storage medium storing instructions which, when executed by at least one processor of a machine, causes the machine to perform operations comprising:

receiving an advertisement order that describes an advertising campaign in logical terms, wherein the advertising order comprises a plurality of advertisements, each associated with a priority parameter;

accessing stored data comprising metrics associated with distributed content;

based on the stored data and requirements indicated in the advertisement order, translating the logical terms of the advertising campaign into physical parameters;

creating an advertising schedule comprising at least a portion of the advertisements from the advertising order to satisfy a portion of the advertising order based on the physical parameters;

receiving feedback regarding playing of advertisements from the advertising order in the advertising schedule from at least one external source;

determining progress of the advertising campaign based on the feedback; and dynamically placing remaining advertisements of the advertisement order into the advertising schedule for use in an on-demand playback environment based on the associated priority parameter, a percentage of the advertisement order having been executed relative to a time left to satisfy the advertisement order.

11. The non-transitory machine-readable storage medium of claim 10, wherein the operations further comprise:

tracking the progress of a campaign goal of the advertising campaign using the feedback.

12. The non-transitory machine-readable storage medium of claim 11, wherein the operations further comprise adjusting the advertising schedule based on the feedback indicating that an advertisement was not properly displayed.

13. A system comprising:

a processor of a machine;

a hardware-implemented order module to receive, at an advertisement management system, an advertisement order that describes an advertising campaign in logical terms, wherein the advertising order comprises a plurality of advertisements, each associated with a priority parameter;

a hardware-implemented data access module to access stored data of statistically sampled metrics associated with predetermined audiovisual entertainment material;

a hardware-implemented order evaluation module to translate, using the processor of a machine and based on the stored data and requirements indicated in the advertisement order, the logical terms of the advertising campaign into physical parameters adapted to place advertisements into an advertising schedule;

a hardware-implemented scheduling engine to create the advertising schedule comprising at least a portion of the advertisements from the advertising order to satisfy a portion of the advertising order based on the physical parameters;

a data storage to maintain the advertising schedule;

a hardware-implemented feedback module to receive feedback regarding playing of advertisements of the advertising order in the advertising schedule from at least one external source; and a hardware-implemented planning adjustment module to determine progress of the advertising campaign based on the feedback and to dynamically place remaining advertisements of the advertisement order into the advertising schedule for use in an on-demand playback environment based on the associated priority parameter, a percentage of the advertisement order having been executed relative to a time left to satisfy the advertisement order.

14. The system of claim 13, wherein the hardware-implemented feedback module is further to reliably and verifiably track the progress of a campaign goal of the advertising campaign using the feedback.

15. The method of claim 3, wherein the tracking the progress of the campaign goal of the advertising campaign using the feedback comprises:

translating physical parameters of measurements logged in the feedback into feedback logical terms; and comparing the feedback logical terms to the logical terms of the advertising campaign described in the advertisement order.

16. The method of claim 1, wherein dynamically adjusting the advertising schedule further comprises placing one or more substitute advertisements into the advertising schedule in response to determining that a time parameter, representing time elapsed since original airing of the requested content, exceeds a time threshold.

17. The method of claim 10, wherein dynamically adjusting the advertising schedule further comprises placing one or more substitute advertisements into the advertising schedule in response to determining that a time parameter, representing time elapsed since original airing of the requested content, exceeds a time threshold.

18. The method of claim 13, wherein the hardware-implemented planning adjustment module is further to place one or more substitute advertisements into the advertising schedule in response to determining that a time parameter, representing time elapsed since original airing of the requested content, exceeds a time threshold.

* * * * *